3,322,867
METHOD OF MAKING POROUS REFRACTORY PRODUCTS
Pierre Leroy, St. Germain-en-Laye, and Roger Simon, Boutheon, France, assignors to Compagnie des Ateliers et Forges de la Loire (St. Chamond, Firminy, St. Etienne, Jacob-Holtzer), Paris, France
No Drawing. Filed Apr. 9, 1964, Ser. No. 358,639
Claims priority, application France, Apr. 10, 1963, 931,171, Patent 83,454; Jan. 29, 1964, 961,933, Patent 85,172
7 Claims. (Cl. 264—30)

This invention relates to improved refractory compositions, more especially porous refractory compositions, and to methods of making them.

In the fields of metallurgy and other engineering arts involving the use of high temperatures, it is often of interest to have available porous compositions capable of withstanding elevated temperatures. By way of example, in certain metallurgical processes it is desirable to discharge a blast of oxygen or other gas through a porous refractory wall into a bath of molten metal to react with the metal in the bath. Considerable difficulties have been encountered in the art in providing a wholly satisfactory porous refractory material that would also possess good mechanical strength and cohesion at the high temperatures of use. Thus, in the particular application just mentioned, it has been found that the conventional porous refractory elements in direct contact with the high-temperature molten metal do not stand up well in service but require frequent replacement.

It is a broad object of this invention to provide a novel process for making refractory compositions of porous consistency, having improved high-temperature cohesion and strength characteristics over those currently available.

In our co-pending patent application U.S. Ser. No. 272,515 filed on April 12, 1963, we have disclosed a method of producing a porous refractory element which in an important aspect comprises the steps of preparing a homogenous mix including a high-temperature sinterable aggregate constituent substantially free from fines, a refractory binder constituent capable of imparting adequate cohesion to the mix at relatively low temperatures until a subsequent heating step has been performed, and an oxidizable powder constituent; forming the mix into a shaped porous element, heating the element to a temperature approaching the range of sintering temperatures of said aggregate; and circulating oxidizing gas through the pores of the element during the heating step to oxidize said powder therein whereby to create a multiplicity of point heat-sources distributed throughout the element ensuring that substantially all the particles of high-temperature sinterable aggregate are effectively sintered.

This present invention relates to a process of making porous refractories which has certain features in common with the process disclosed in our copending application just mentioned, but differs therefrom in certain important aspects which renders the subject process more economical and imparts additional advantages thereto.

A feature of this invention relates to the selection of the oxidizable constituent in the mix, constituent which can be nonmetallic, and specifically which is preferably so selected as to present per se binding characteristics for the aggregate with which it is admixed, whereby the inclusion of a separate binder constituent, as required in the method disclosed in the copending application, may be dispensed with.

In a preferred embodiment of the invention the oxidizable constituent is a carbon-containing substance. Various carbon-base substances have been successfully tested in accordance with the invention, including especially carbon powder obtained by grinding pieces of broken or otherwise rejected carbon electrodes of the kind used in various electro-metallurgical processes. Pitch and tarry products including deposits produced in tar distillation or in hydrocarbon cracking processes have also proved satisfactory. In one embodiment of the invention, the carbon-base oxidizable ingredient may be introduced in the form of tar or the like into the mix, and allowed to distill during the normal firing step to which the mix is exposed in accordance with the invention, and the mix is then preferably allowed to cool slowly whereupon it is found that the particles of the aggregate constituent in the mix are substantially individually and uniformly coated with a pitch-like distillation residue of the tar initially introduced. On subsequently passing a stream of oxidizing gas through the heated mix in accordance with an essential step of the process, these carbon-containing pitch coatings surrounding the particles of sinterable aggregate react exothermally in the manner earlier described to provide uniform sintering throughout the mix.

In accordance with the present invention the oxidizable constituent may comprise in addition to or instead of the carbon-base constituent just referred to, other exothermally oxidizable substances including especially silicon, calcium, sulfur, chrome, and the like. A silico-calcium composition is especially contemplated.

Another feature of the present invention relates to the manner in which the step of circulating oxidizing gas through the mix in order to oxidize the oxidizable constituent present in divided form therein is conducted. Thus, whereas in the prior method disclosed in our copending application the said oxidizing step was described as being conducted concurrently with the step of firing the element, it has now been found to be frequently more expedient to perform the oxidizing step in a separate and subsequent stage by discharging the oxidizing gas through the shaped element at high temperature. In one convenient embodiment of this aspect of the present invention, the oxidizing step may actually be delayed until the porous refractory element has been definitively installed in its final position in the metallurgical furnace converter, or other apparatus for which it was designed, and said oxidizing step may in fact form part of the normal metallurgical or other process performed in such apparatus. For example, the porous element produced by the improved method of the invention may form part of a porous wall section of a converter or other container for a bath of molten metal used in a process which involves discharging a blast of oxygen through said porous wall into the container for oxidizing the molten metal therein, e.g. a Bessemer steel conversion process. In such and similar instances, the porous elements of the invention would be installed in the apparatus after shaping and firing but prior to the oxidizing step, and the discharge of oxygen containing gas effected after the apparatus has been placed in service, would serve to oxidize the oxidizable constituent in the element and thus serve to complete the process of the invention.

In addition to or instead of the feature just mentioned it is contemplated according to the present invention that the stream of oxygen containing gas passed through the mix or element to oxidize the oxidizable constituent therein is preheated.

Both the preheating of the oxidizing gas delivered through the refractory elements of the invention or the mix during firing, and the omission of the oxidizing step during the firing and the delaying of such step until a later opportunity such as during subsequent use of the element as described above, have an advantage in common in that both such procedures will avoid the occurrence of cracks in the composition, as are liable to occur when a blast of cool oxidizing gas is discharged through the high-temperature composition in the firing furnace. While this last procedure may well be unobjectionable in the case of certain refractory mixes according to the invention which are comparatively insensitive to thermal shock, and/or where the rate of oxidation of the oxidizing constituent used is very high so that the heat envolved by the oxidation reaction is sufficient both to preheat rapidly the cool oxidizing gas and effect the high-temperature sintering action required in the process of the invention, there are many cases where this would not be the case and the thermal shock produced would result in the cracks referred to above. One way of avoiding such cracking and the resulting rejects due to thermal shock is to preheat the stream of oxidizing gas discharged through the mix undergoing firing. Another way of achieving the same result is to omit the discharge of oxidizing gas into the firing furnace and rely on the subsequent discharge of oxidizing gas during a metallurgical process performed with the apparatus of which the refractory element of the invention forms part, in order to achieve the desired oxidation of the oxidizable constituent and consequent sintering of the aggregate constituent in said element. When this last procedure is used the porous element is carried to a high temperature in the hot areas of the apparatus, e.g. adjacent the inner surface of a converter or the like containing a bath of molten metal. The exothermal oxidation reaction within the mass, and resulting high-temperature sintering of the aggregate in accordance with the invention, will then proceed in such regions a short time before direct contact actually occurs between the porous refractory element and the high-temperature molten metal or other high-temperature medium present within the furnace.

As indicated earlier herein a carbon-base substance such as tarry and the like hydrocarbon materials, are advantageously used as the oxidizable constituents in the improved mixes. Compositions of this character not only possess binding properties which render the introduction of separate binders in the composition of the invention superfluous and thereby render the manufacturing process simpler and more economical, as already mentioned, but have certain additional advantages. These include preventing attack and/or objectionable side reactions of the oxidation products of the oxidizable constituent with the aggregate constituent. The oxidation products of carbon when fully reacted are gaseous and are thus promptly discharged from the mix. Further, and this is especially useful in the case of certain aggregate constituents such as magnesite which are sensitive to such side reactions while otherwise being especially desirable for use in certain compositions of the invention, carbon-containing oxidizable constituents of the type mentioned above can according to a feature of the present invention be made to react only partially with the oxygen in the oxidizing gas. That is, they may be distilled at moderate temperature, so that the residual unreacted carbon will serve as a reducer agent present in the composition to protect the magnesite or other sensitive sinterable aggregate against chemical reaction with metal oxides, such as those produced in a bath of molten during a metallurgical process in which the apparatus of which the elements of the invention form part is involved.

In this aspect of the invention, which will be clarified in the example given hereinafter, the refractory elements are first exposed to the oxidizing step for finally sintering the sinterable aggregate constituent therein, only after the elements have been installed in a furnace or the like and such furnace has been placed into service, that is, during the metallurgical process performed with the furnace. The oxidizing gas then delivered through the porous refractory elements will, as already explained herein, oxidize the carbon-containing constituents in the portions of the elements positioned nearer the inner surface of the furnace and hence at higher temperatures, while the carbon-containing constituents in the lower-temperature portions of the elements more remote from said inner surface will remain substantially unoxidized, thus protecting the sinterable magnesite from attack.

As the metallurgical process is continued over long periods of time and the refractory material of the invention wears off at the internal surface of the apparatus in contact with the molten metal or other high-temperature medium therein so that deeper and deeper areas of the refractory composition gradually approach said high-temperature region, the stream of oxidizing gas injected through said composition in the normal operation of the metallurgical process progressively oxidizes and burns up the previously unreacted carbon constituent in said composition and concurrently sinters the sinterable aggregate constituent therein, shortly before said constituents are exposed to the direct contact of the molten metal bath or other high-temperature contents of the apparatus.

Thus it will be seen that in this aspect of the invention the process of formation of the improved porous refractory composition occurs only gradually throughout the service life of the apparatus of which the composition forms part and concurrently with the process which said apparatus serves to perform. This serves to retain the somewhat delicate sinterable constituents of the composition, such as magnesite, in a protected condition over maximum periods of time and prolongs the useful life of the apparatus.

As indicated above, the oxidizable constituent in the composition of the present invention may comprise or contain other exothermally oxidizable substances, including silicon or/and calcium, sulfur, chrome and the like. Silicon and calcium are especially useful in that these substances are highly exothermic in their reaction with oxygen, so that the proportion of such constituents relatively to the sinterable aggregate constituent can be quite low.

As an illustration of the practical working of the invention the following example is given. In this example the invention is applied to the provision of a porous refractory base for a basic steel converter vessel.

Magnesite aggregate having the following granulometric composition: Fines under 0.5 mm.—0%; from 0.5 to 1 mm.—65%; from 1 to 2 mm.—35%, was mixed with tar in a proportion of 88% aggregate and 12% tar by weight. The mix was very thoroughly milled to produce a homogenous mass and was then press-molded into blocks of the requisite shape in steel molds. The molds with the shaped blocks therein were placed in a firing oven and maintained at a temperature of 650° C. for a sufficient time to produce a substantial distillation of the tar. The parts still contained in their molds were then allowed to cool slowly over a period of about 24 hours. When cool the parts were removed from the molds. It was found that the particles of magnesite were quite uniformly coated with films of pitch-like distillation residue from the tar.

The fired porous blocks were then installed in position in the bottom wall of a steel converter vessel, and this was used in a basic process for converting cast iron to steel by blowing pure oxygen or/and air through the porous wall.

Throughout the operation of the process it was found that in the upper region of the porous bottom wall of the converter near the high temperature iron bath in the converter, the oxygen blast produced a complete oxidation of the pitch which resulted in a uniform high-temperature sintering of the magnesite particles coated thereby, while in the cooler regions in the lower parts of said porous wall the pitch was only partly oxidized or not oxidized at all, and the unreacted carbon served as a reducer agent protecting the as yet unsintered magnesite particles from attack.

In this manner a full protection of the magnesite against attack was achieved throughout the depth of the porous wall and the useful life expectancy of the converter was substantially increased.

What is claimed is:

1. A method of preparing a porous refractory element which comprises,
    (1) preparing a homogeneous mix of a high-temperature sinterable aggregate constituent of a particle size ranging from about 0.5 mm. to about 2.0 mm., a refractory binder constituent capable of imparting adequate cohesion to the mix at relatively low temperatures until a subsequent heating step has been performed and a divided non-metal oxidizable constituent which constituent is uniformly distributed throughout said aggregate,
    (2) molding the mix into the desired shaped porous element,
    (3) heating the said element to a temperature approaching the range of sintering temperatures of the aggregate, and
    (4) circulating oxidizing gas through the pores of the element at elevated temperature to oxidize said oxidizable constituent to create a multiplicity of point heat-sources distributed throughout the element ensuring that substantially all the particles of sinterable aggregate are effectively sintered at high temperature.

2. A method of producing a porous refractory element which comprises,
    (1) preparing a homogeneous mix of a high-temperature sinterable aggregate constituent of a particle size ranging from about 0.5 mm. to about 2.0 mm. and a divided non-metal oxidizable carbon-containing constituent, said constituent possessing binder properties,
    (2) molding the mix into the desired shaped porous element,
    (3) heating the element to a temperature approaching the range of sintering temperatures of said aggregate, and
    (4) circulating oxidizing gas through the pores of the element at elevated temperature to oxidize said carbon to create a multiplicity of point heat-sources distributed throughout the element ensuring that substantially all the particles of sinterable aggregate are effectively sintered at high temperature.

3. A method of producing a porous refractory element which comprises,
    (1) preparing a homogeneous mix of a high-temperature sinterable aggregate constituent of a particle size ranging from about 0.5 mm. to about 2.0 mm. and a distillable carbon-containing constituent,
    (2) molding the mix into the desired shaped porous element,
    (3) heating the element to a moderate temperature sufficient at least to partly distill said carbon-containing constituent,
    (4) allowing the element to cool, and
    (5) subsequently circulating oxidizing gas through the pores of the element at elevated temperature to burn the distillation residue of said carbon-containing constituent whereby to create a multiplicity of point heat-sources distributed throughout the element ensuring that substantially all the particles of sinterable constituent are effectively sintered.

4. A method for providing a porous refractory element for a wall of metallurgical apparatus in the operation of which apparatus a high-temperature medium is to be provided at one side of said wall and an oxidizing gas is to be discharged through said wall from the other side thereof into said high-temperature medium, which method comprises,
    (1) preparing a homogeneous mix of a high-temperature-sinterable aggregate constituent of a particle size ranging from about 0.5 mm. to about 2.0 mm., a refractory binder constituent capable of imparting adequate cohesion to the mix at relatively low temperatures until a subsequent heating step has been performed and an exothermally-oxidizable non-metal constituent uniformly distributed therein,
    (2) molding said mix into the desired shaped element and installing the shaped element in said apparatus as part of said wall thereof,
    (3) during the subsequent operation of said apparatus oxidizing said exothermally-oxidizable constituent adjacent said high-temperature medium at said one side of the wall with said oxidizable gas discharged through the element, and
    (4) effectively sintering said sinterable aggregate constituent adjacent said one side of the wall with the heat from the exothermic oxidation reaction.

5. A method as defined in claim 4, wherein said apparatus comprises a steel converter vessel and said high-temperature medium comprises molten iron.

6. A method as defined in claim 4 wherein said aggregate constituent comprises magnesia.

7. A method as defined in claim 4, wherein said aggregate constituent comprises dolomite.

References Cited

UNITED STATES PATENTS

| Re. 18,506 | 6/1932 | Mandel | 264—43 |
|---|---|---|---|
| 2,122,288 | 6/1938 | Knote | 264—44 |
| 2,199,046 | 4/1940 | Evenstad | 264—44 XR |
| 2,493,763 | 1/1950 | Klinefelter | 106—41 |
| 2,593,507 | 4/1952 | Wainer | 264—44 |
| 2,741,822 | 4/1956 | Udy | 264—60 XR |
| 2,943,240 | 6/1960 | Martinet. | |
| 3,070,449 | 12/1962 | Davies et al. | |
| 3,086,876 | 4/1963 | Griggs et al. | 106—63 |

ROBERT F. WHITE, *Primary Examiner.*

J. A. FINLAYSON, *Assistant Examiner.*